United States Patent
Kawamata

(10) Patent No.: US 9,615,556 B2
(45) Date of Patent: Apr. 11, 2017

(54) DUAL-BEARING REEL

(71) Applicant: Shimano Inc., Sakai, Osaka (JP)

(72) Inventor: Atsushi Kawamata, Osaka (JP)

(73) Assignee: Shimano Inc., Osaka (JP)

( * ) Notice: Subject to any disclaimer, the term of this patent is extended or adjusted under 35 U.S.C. 154(b) by 352 days.

(21) Appl. No.: 14/458,810

(22) Filed: Aug. 13, 2014

(65) Prior Publication Data

US 2015/0083840 A1    Mar. 26, 2015

(30) Foreign Application Priority Data

Sep. 20, 2013  (JP) .................................. 2013-195376

(51) Int. Cl.
| | | |
|---|---|---|
| A01K 89/01 | (2006.01) | |
| A01K 89/017 | (2006.01) | |
| A01K 89/015 | (2006.01) | |

(52) U.S. Cl.
CPC .......... *A01K 89/017* (2013.01); *A01K 89/015* (2013.01)

(58) Field of Classification Search
CPC ................ A01K 89/015; A01K 89/017; A01K 89/0173; A01K 89/019125; A01K 89/01915; A01K 89/0192
See application file for complete search history.

(56) References Cited

U.S. PATENT DOCUMENTS

| | | | | |
|---|---|---|---|---|
| 1,468,676 | A * | 9/1923 | Russell ................ | A01K 89/015 242/279 |
| 3,993,264 | A * | 11/1976 | Kamikawa ........... | A01K 89/015 242/277 |
| 5,127,603 | A * | 7/1992 | Morimoto ............ | A01K 89/015 242/279 |
| 5,503,345 | A * | 4/1996 | Kaneko ................ | A01K 89/015 242/279 |
| 5,829,701 | A * | 11/1998 | Murayama ........... | A01K 89/015 242/310 |
| 5,833,155 | A * | 11/1998 | Murayama ........... | A01K 89/015 242/277 |
| 6,003,801 | A * | 12/1999 | Kobayashi ........... | A01K 89/015 242/310 |
| 6,446,895 | B1 * | 9/2002 | Baenziger ............ | A01K 89/015 242/277 |

(Continued)

FOREIGN PATENT DOCUMENTS

JP    3031909 U    9/1996

*Primary Examiner* — Emmanuel M Marcelo

(74) *Attorney, Agent, or Firm* — Global IP Counsiors, LLP

(57) ABSTRACT

An electric reel includes a reel unit, a spool, a level wind mechanism and a plate member. The reel unit includes a fishing rod attachment leg and a frame. The frame includes a first side plate disposed on the same side as a handle and a second side plate disposed opposite the first side plate so as to enable the spool to be disposed between the first side plate and the second side plate. The spool is rotatable with respect to the reel unit. The level wind mechanism includes a fishing line guide that is disposed forward of the spool and is reciprocatable along a spool shaft as a rotation shaft of the spool. The plate member is a plate-shaped member disposed between the spool and the fishing line guide along the axial direction of the spool shaft, and is attached to the reel unit from a side lateral to the frame.

13 Claims, 8 Drawing Sheets

(56) References Cited

U.S. PATENT DOCUMENTS

| | | | | |
|---|---|---|---|---|
| 8,517,298 B1* | 8/2013 | Benson | ............... | A01K 89/015 242/249 |
| 8,770,504 B1* | 7/2014 | Sandstrom | ........... | A01K 89/017 242/225 |
| 2004/0075005 A1* | 4/2004 | Myojo | ................ | A01K 89/015 242/310 |
| 2010/0187346 A1* | 7/2010 | Ochiai | ............... | A01K 89/0114 242/242 |
| 2012/0318902 A1* | 12/2012 | Kawabe | .............. | A01K 89/017 242/298 |

* cited by examiner

DUAL-BEARING REEL

CROSS-REFERENCE TO RELATED APPLICATIONS

This application claims priority to Japanese Patent Application No. 2013-195376 filed on Sep. 20, 2013, the entirety of which is hereby incorporated by reference in its entirety.

BACKGROUND

Field of the Invention

The present invention relates to a fishing reel, particularly to a dual-bearing reel that is attachable to a fishing rod and is configured to forwardly reel out a fishing line.

Background Information

Dual-bearing reels are a type of reel configured to forwardly reel out a fishing line by rotating a spool through motor driving or manual operation. Some of the dual-bearing reels of this type are equipped with a level wind mechanism. The level wind mechanism is a mechanism configured to reciprocate the fishing line in the axial direction of the spool so as to wind the fishing line onto the spool as evenly as possible. The level wind mechanism includes a fishing line guide for guiding the fishing line and a guide moving mechanism configured to reciprocate the fishing line guide in the axial direction of the spool at least in winding the fishing line. The fishing line guide is mounted to a position forward of the spool, while being movable in the axial direction of the spool. The guide moving mechanism includes a traverse cam shaft, a guide mechanism and a cam shaft cover formed in a tubular shape. The traverse cam shaft is configured to reciprocate the fishing line guide at least in conjunction with the rotation of the handle in a fishing-line winding direction. The guide member guides the fishing line guide along the axial direction. The cam shaft cover covers the outer periphery of the traverse cam shaft, while the fishing line guide is disposed on the outer periphery of the cam shaft cover.

A type of dual-bearing reel has been known that is compactly formed by disposing the fishing line guide adjacently to the spool (e.g., see Japan Registered Utility Model Publication No. JP-U-3031909). In such a structure that the fishing line guide is disposed adjacently to the spool, chances are that the fishing line gets stuck with the fishing line guide when sagging from the spool. To prevent this, the well-known dual-bearing reel is provided with a plate member attached to the surrounding of the spool. The well-known plate member is disposed so as to surround the outside of the spool in a circular-arc shape in a range from an operating part of a clutch operating member to a position adjacent to the fishing line guide. The plate member is disposed between a right side plate and a left side plate.

According to the well-known dual-bearing reel, it is indefinite how the plate member is disposed between the right side plate and the left side plate. However, when a structure is assumed that the plate member is provided separately from the reel unit, the plate member is supposed to be disposed in a range from the clutch operating member to the position adjacent to the fishing line guide while being located between the pair of right and left side plates. Thus, the plate member cannot be easily attached to the reel unit.

SUMMARY

It is an object of the present invention to enable a plate member to be easily attached to a reel unit in a dual-bearing reel capable of preventing a fishing line from getting stuck with a level wind mechanism.

A dual-bearing reel according to the present invention is attachable to a fishing rod and is configured to forwardly reel out a fishing line. The dual-bearing reel includes a handle, a reel unit, a spool, a level wind mechanism and a plate member. The reel unit includes a fishing rod attachment leg and a frame. The fishing rod attachment leg enables the fishing rod to be attached thereto. The frame has a first side plate and a second side plate. The first side plate is disposed on the same side as the handle. The second side plate is disposed away from the first side plate so as to enable the spool to be disposed between the first side plate and the second side plate. The spool is rotatable with respect to the reel unit and is capable of winding the fishing line thereabout. The level wind mechanism includes a fishing line guide that is disposed forward of the spool and is reciprocatable along a rotation shaft of the spool. The plate member is a member formed in a plate shape. The plate member is disposed between the spool and the fishing line guide along an axial direction of the rotation shaft, and is attached to the reel unit from a side lateral to the frame.

In the present dual-bearing reel, the plate member is disposed between the spool and the fishing line guide, and is attached to the reel unit from the side lateral to the reel unit frame having the first side plate and the second side plate. In attaching this structured plate member to the reel unit from the side lateral to the flame, attachment of the plate member is enabled by forming a slit with a width slightly greater than the plate thickness of the plate member in the frame. Here, the plate member, designed to be disposed between the spool and the fishing line guide, is attached to the reel unit from the side lateral to the frame. Therefore, the plate member can be easily attached to the reel unit.

Moreover, the plate member may be fixed to the second side plate, and may extend toward the first side plate while penetrating through the second side plate. According to the structure, the number of mechanisms to be attached to the second side plate disposed on the opposite side of the handle is less than the number of mechanisms to be attached to the first side plate disposed on the same side as the handle. Therefore, the plate member can be further easily attached to the reel unit.

Moreover, the second side plate may have an opening formed in a circular shape. The reel unit may further include a lid member that is detachably fixed to the second side plate so as to close the opening. The plate member may be restricted from moving in a direction outwardly away from the second side plate by the lid member. According to the structure, the plate member is restricted from moving in the direction outwardly away from the second side plate by the lid member closing the opening. Hence, it is not required to provide an element for restricting movement of the plate member. Thus, the dual-bearing reel can be simply structured.

Moreover, the second side plate may have a slit enabling the plate member to penetrate therethrough. The first side plate may have an engaging groove enabling one end of the plate member to be engaged therewith. The one end is disposed on the same side as the first side plate. According to the structure, one end of the plate member is engaged with the engaging groove of the first side plate while penetrating through the slit formed in the second side plate. Therefore, it is possible to easily position the plate member both to the first side plate by the engaging groove and to the second side plate by the slit.

Moreover, the plate member may have a fixation part on the other end thereof disposed on the same side as the second side plate. The fixation part is fixed to the second side plate while being interposed between the lid member and the second side plate. According to the structure, the plate member is fixed to the reel unit while the fixation part thereof is interposed between the lid member and the second side plate. Therefore, the plate member can be fixed to the reel unit without using a fixation member such as a bolt for fixing the plate member. On the other hand, the plate member can be easily detached from the reel unit when being unnecessary.

Moreover, the level wind mechanism may further include a traverse cam shaft and a cam shaft cover. The traverse cam shaft is configured to reciprocate the fishing line guide in conjunction with rotation of the handle. The cam shaft cover is a member formed in a tubular shape. The cam shaft cover covers an outer periphery of the traverse cam shaft, while allowing the fishing line guide to be disposed on an outer periphery thereof. An end of the plate member on a side away from the fishing rod attachment leg in a direction intersecting with an elongated direction of the plate member is disposed on the side away from the fishing rod attachment leg with respect to a tangent connecting an outer peripheral part of the cam shaft cover on the same side as the fishing rod attachment leg and a fishing-line maximally wound position of the spool on the side away from the fishing rod attachment leg. According to the structure, the end of the plate member on the side away from the fishing rod attachment leg is disposed on the side away from the fishing rod attachment leg with respect to the tangent. The tangent is herein set as a line touching the outer periphery of the cam shaft cover on the same side as the fishing rod attachment leg and the fishing-line maximally wound position of the spool on the side away from the fishing rod attachment leg. In other words, the tangent intersects with a line connecting the center of the spool and the center of the cam shaft cover. The end of the plate member is disposed on the side away from the fishing rod attachment leg with respect to the tangent set as described above. Hence, the fishing line, sagging from the spool, becomes further unlikely to get stuck with the fishing line guide.

Moreover, the dual-bearing reel may further include an electric motor that is disposed forward of the level wind mechanism and is configured to drive and rotate the spool. According to the structure, the plate member can be easily attached to the reel unit in an electric reel.

According to the present invention, the plate member, designed to be disposed between the spool and the fishing line guide, is attached to the reel unit from the side lateral to the frame. Therefore, the plate member can be easily attached to the reel unit.

BRIEF DESCRIPTION OF THE DRAWINGS

Referring now to the attached drawings which form a part of this original disclosure.

DETAILED DESCRIPTION OF EMBODIMENTS

Figure 1:
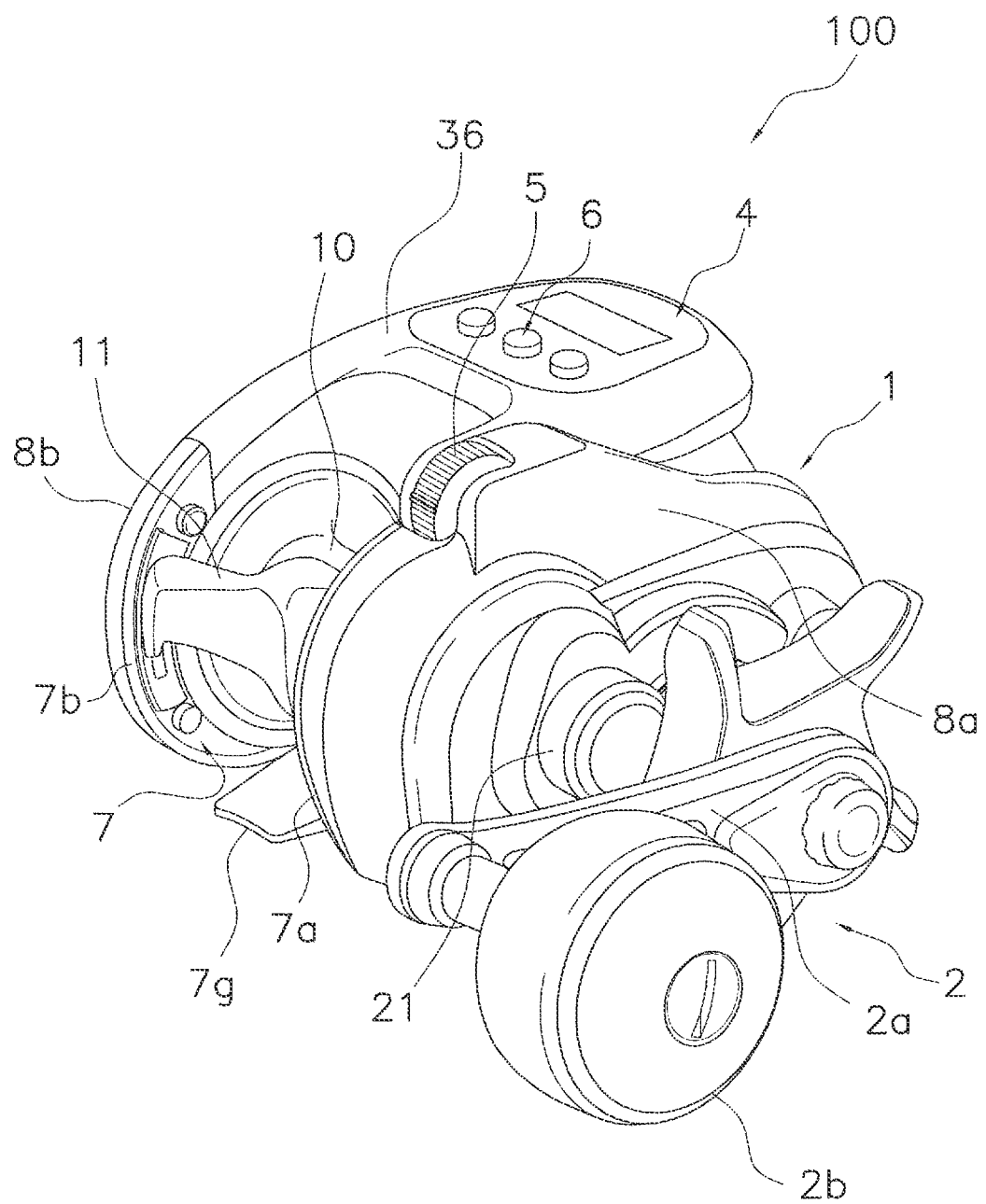
FIG. 1 is a perspective view of an electric reel exemplified as a dual-bearing reel according to an exemplary embodiment of the present invention.
Figure 2:
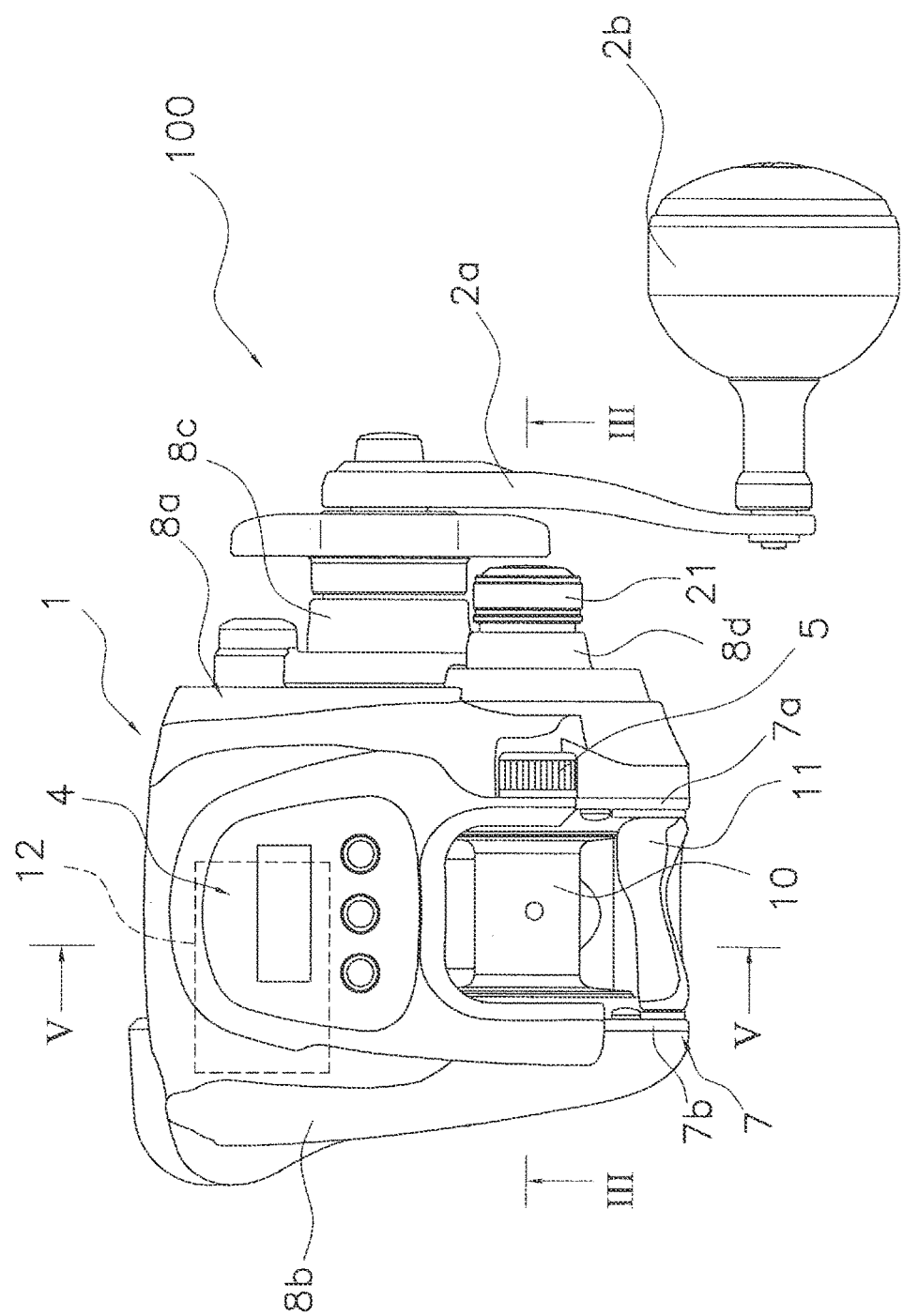
FIG. 2 is a plan view of the electric reel.

FIGS. 1 and 2 illustrate an electric reel 100 exemplified as a dual-bearing reel according to an exemplary embodiment of the present invention. The electric reel 100 is a compact electric reel configured to be driven by electric power supplied from an external power source. However, the electric reel 100 is also configured to be usable as a manual reel. Further, the electric reel 100 has a water depth displaying function of displaying the water depth of a terminal tackle in accordance with the released/wound length of a fishing line. It should be noted that the electric reel 100 is embedded with an internal power source for activating the water depth displaying function when being used as a manual reel without the external power source.

Figure 3:
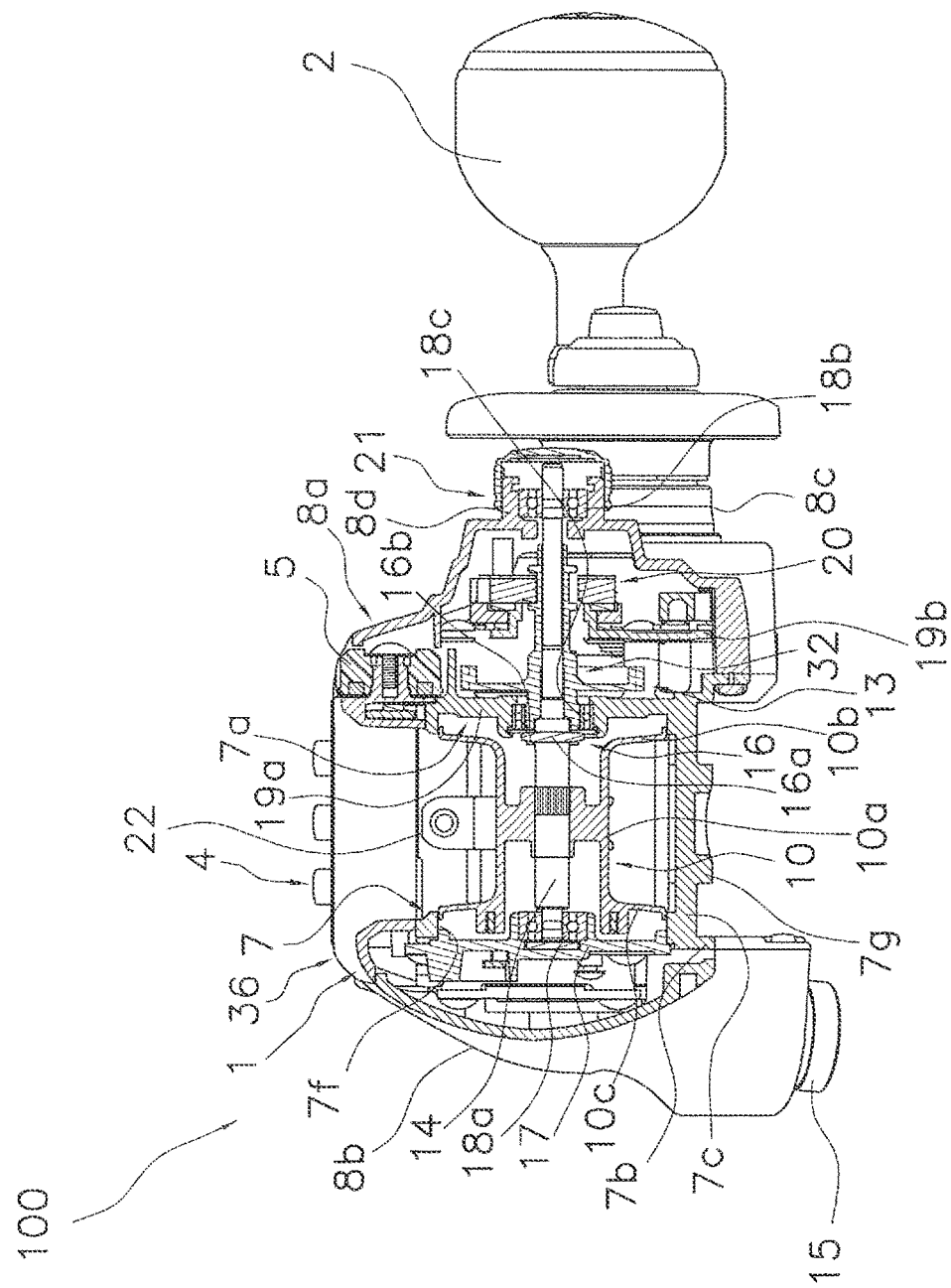
FIG. 3 is a cross-sectional view of FIG. 2 taken along a cutaway line III-III.
Figure 4:
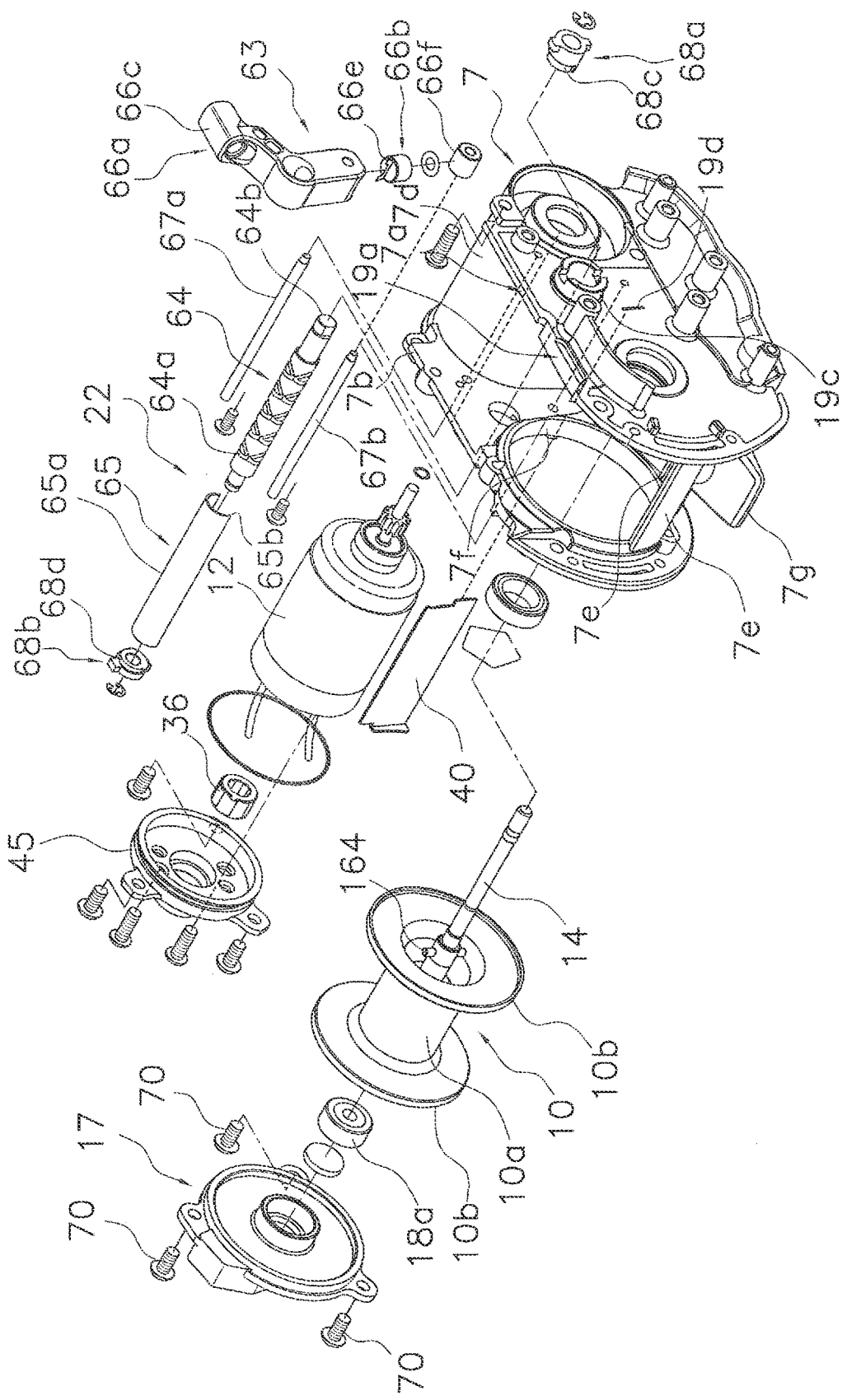
FIG. 4 is an exploded perspective view of a part of the electric reel.
Figure 5:
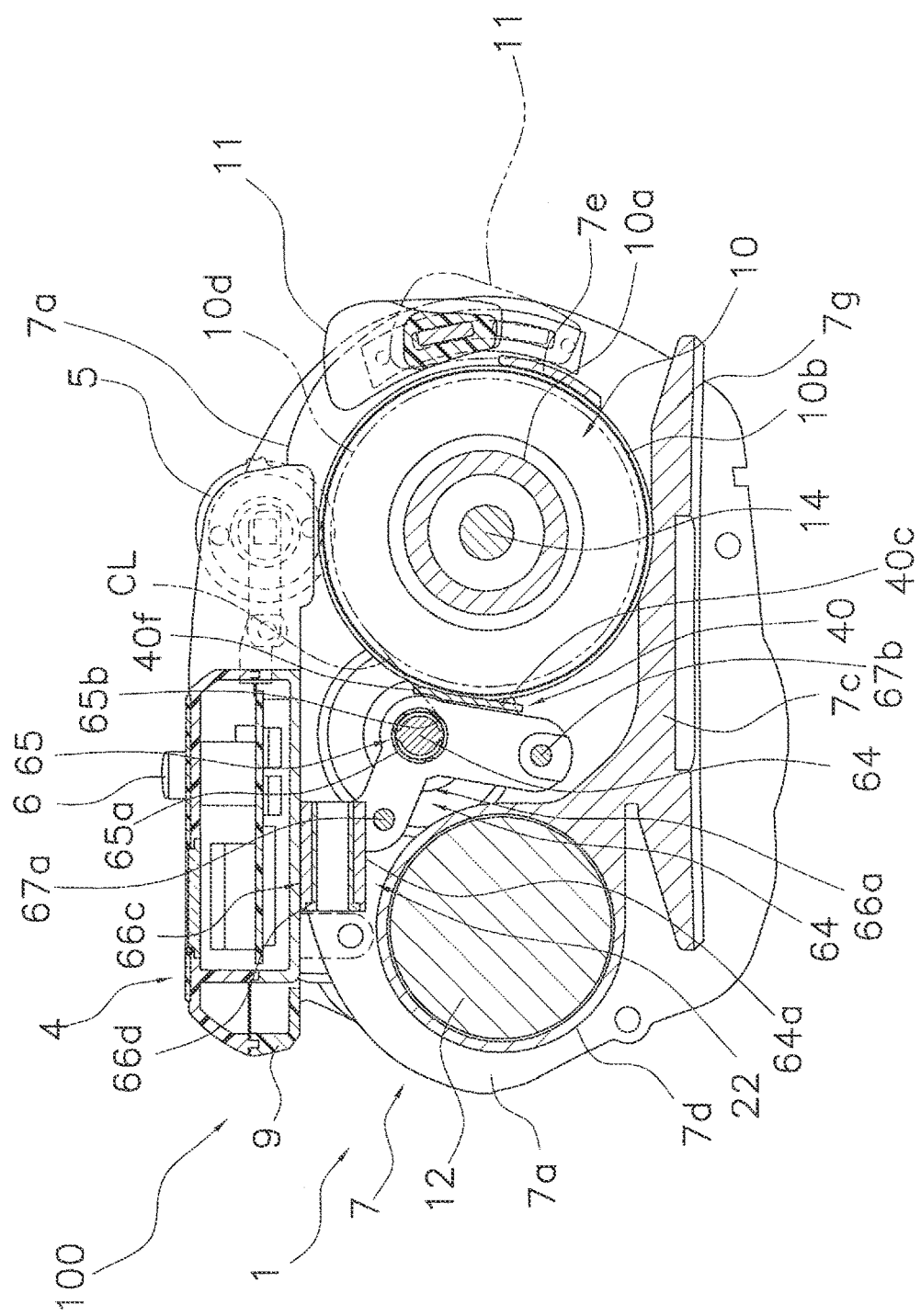
FIG. 5 is a cross-sectional view of FIG. 2 taken along a cutaway line V-V.

The electric reel 100 includes a reel unit 1, a handle 2, a spool 10, a clutch operating member 11, a motor 12 (see FIGS. 2, 4 and 5), a spool drive mechanism 13 (see FIG. 8), a clutch mechanism 16 (see FIG. 3), a level wind mechanism 22 (see FIGS. 4 and 5) and a plate member 40 that is plate-shaped (see FIGS. 4 and 5). The reel unit 1 is attachable to a fishing rod and includes a water depth displaying unit 4.

The handle 2 is rotatably mounted to the reel unit 1. The spool 10 is rotatably mounted to the reel unit 1. The clutch operating member 11 serves to perform an on/off operation of the clutch mechanism 16, and is movably mounted to the rear part of the reel unit 1. The motor 12 is mounted to the reel unit 1, and is configured to drive and rotate the spool 10. The spool drive mechanism 13 is configured to drive the spool 10 in accordance with the rotation of the handle 2 and the driving force of the motor 12. The clutch mechanism 16 is switchable between a clutch-on state and a clutch-off state in response to the operation of the clutch operating member 11. The clutch-on state allows the rotation of the handle 2 and the driving force of the motor 12 to be transmitted to the spool 10, whereas the clutch-off state prevents the rotation of the handle 2 and the driving force of the motor 12 from being transmitted to the spool 10. The level wind mechanism 22 is a mechanism configured to reciprocate the fishing line in the axial direction of the spool 10 so as to wind the fishing line onto the spool 10 as evenly as possible. The plate member 40 is a member for preventing the fishing line from getting stuck with the level wind mechanism 22.

<Reel Unit>

The reel unit 1 includes a fishing rod attachment leg 7g, a frame 7, a first side cover 8a, a second side cover 8b, a front cover 9 (see FIG. 5) and the water depth displaying unit 4. The fishing rod attachment leg 7g is attachable to the fishing rod. The frame 7 is an integrally formed member made of, for instance, synthetic resin or metal. As illustrated in FIGS. 3, 4 and 5, the frame 7 has a first side plate 7a, a second side plate 7b, a first coupling member 7c, a second coupling member 7d and a third coupling member 7e. The first side plate 7a is disposed on the same side as the handle 2. The second side plate 7b is disposed away from the first side plate 7a at an interval in the right-and-left direction (in FIG. 3). The first, second and third coupling members 7c, 7d and 7e couple the first side plate 7a and the second side plate 7b. The first side cover 8a covers one side of the frame 7 to which the handle 2 is attached, whereas the second side cover 8b covers the other side of the frame 7 that is opposite to the handle attached side. The front cover 9 covers the front part of the frame 7.

The first side plate 7a has a side plate body 19a and a mechanism attachment plate 19b. The mechanism attachment plate 19b is disposed away from the side plate body 19a at an interval, and serves to attach a variety of mechanisms thereto. As illustrated in FIG. 4, the side plate body 19a has a first boss 19c and an engaging groove 19d. The first boss 19c protrudes in a tubular shape. The engaging groove 19d is formed in a position lower than and rearward of the first boss 19c. A first bushing 68a is non-rotatably mounted to the inner peripheral part of the first boss 19c. A traverse cam shaft 64 (to be described) of the level wind mechanism 22 is rotatably supported by the first boss 19c through the first bushing 68a. The first bushing 68a is attached to the first boss 19c from the same side as the outer surface (i.e., the surface disposed oppositely to the mechanism attachment plate 19b) of the first boss 19c. The first bushing 68a partially protrudes from the first boss 19c to the inward, while penetrating the first boss 19c. The first bushing 68a has a first recess 68c formed in a circular-arc shape on the part thereof inwardly protruding from the first boss 19c. A second gear member 61 is rotatably mounted to the outer peripheral part of the first boss 19c through a bearing. Although described below, the second gear member 61 is a member that the traverse cam shaft 64 is coupled thereto while being unitarily rotatable therewith. The engaging groove 19d is formed in an elongated rectangular shape with a narrow width. An engaging part 40a (see FIG. 7) is allowed to be engaged with the engaging groove 19d. Although described below, the engaging part 40a is formed on one end of the plate member 40, i.e., the end disposed on the same side as the first side plate 7a. The width of the engaging groove 19d is equal to or slightly greater than the thickness of the plate member 40. The length of the engaging groove 19d is equal to or slightly greater than the vertical length of the engaging part 40a of the plate member 40.

The mechanism attachment plate 19b is provided for attaching a variety of mechanisms to be described. The mechanism attachment plate 19b is fixed to the outer surface of the side plate body 19a by screws. As illustrated in FIG. 3, the spool drive mechanism 13, a clutch control mechanism 20 and a drag mechanism (not illustrated in the drawings) are mounted between the side plate body 19a and the first side cover 8a. The clutch control mechanism 20 is configured to control the clutch mechanism 16. The drag mechanism is configured to control the rotation of the spool in the fishing-line releasing direction. Further, a casting control mechanism 21 for braking the spool 10 is mounted to the first side cover 8a. The casting control mechanism 21 is a mechanism configured to brake the rotation of the spool 10 by pressing the both ends of a spool shaft 14 (to be described).

Figure 6:
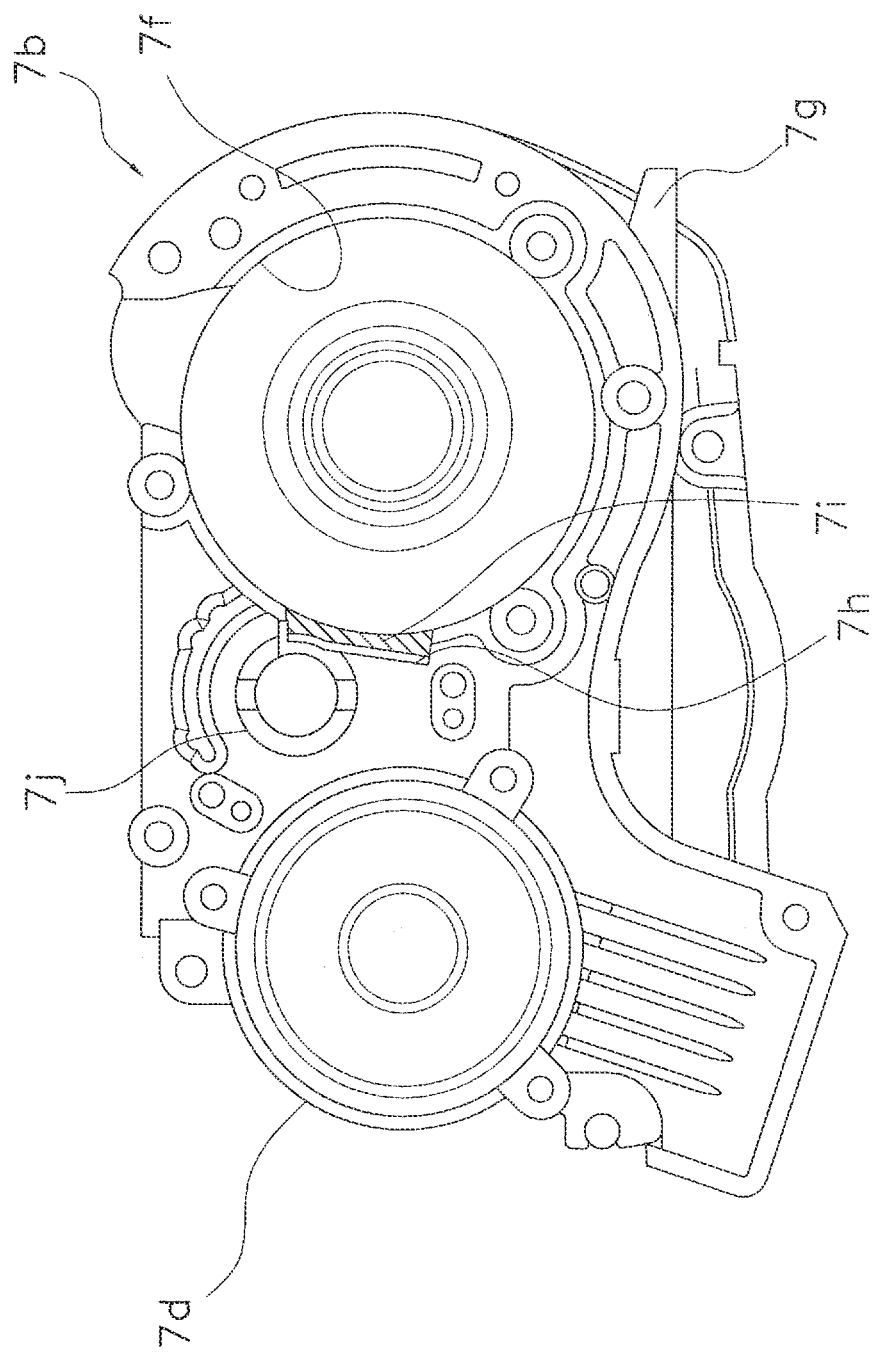
FIG. 6 is a right side view of a frame.

As illustrated in FIGS. 3 and 6, the second side plate 7b has an opening 7f formed in a circular shape such that the spool 10 can pass therethrough. A circular spool support portion 17 is mounted to the opening 7f, while the axis thereof is appropriately aligned. The spool support portion 17 supports a first end (i.e., the left end in FIG. 3) of the spool shaft 14 of the spool 10 in a rotatable state. The spool support portion 17 is an exemplary lid member. The spool support portion 17 is fixed to the outer surface of the second side plate 7b by a plurality of (e.g., three) screw members 70. The spool support portion 17 accommodates a first bearing 18a in the center thereof. The first bearing 18a supports the first end of the spool shaft 14. As illustrated in FIG. 6, the second side plate 7b has a slit 7h bored in a position forward of the opening 7f. The plate member 40 can pass through the slit 7h. Further, the second side plate 7b has an attachment recess 7i formed between the slit 7h and the opening 7f in order to interpose and hold the plate member 40 between the spool support portion 17 and the second side plate 7b. In FIG. 6, the attachment recess 7i is hatched with solid lines for clear representation. Yet further, the second side plate 7b has a second boss 7j formed between the opening 7f and the second coupling member 7d. The second boss 7j is disposed concentrically to the first boss 19c disposed on the side plate body 19a of the first side plate 7a. A second bushing 68b is non-rotatably mounted to the second boss 7j, and the traverse cam shaft 64 is rotatably supported by the second boss 7j through the second bushing 68b. Thus, the both ends of the traverse cam shaft 64 are supported by the first side plate 7a and the second side plate 7b. The second bushing 68b is attached to the second boss 7j from the same side as the outer surface of the second side plate 7b. The second bushing 68b partially protrudes from the second boss 7j to the inward, while penetrating through the second boss 7j. The second bushing 68b has a second recess 68d formed in a circular-arc shape on the part thereof inwardly protruding from the second boss 7j. It should be noted that in FIG. 6, circles depicted with fine lines within the opening 7f and the second coupling member 7d illustrate structures of the first side plate 7a.

As illustrated in FIG. 5, the first coupling member 7c couples the lower parts of the first and second side plates 7a and 7b. The second coupling member 7d couples the front parts of the first and second side plates 7a and 7b, i.e., the parts disposed forward of the spool 10. The first coupling member 7c is a plate-shaped member. The second coupling member 7d is a roughly cylindrical member, and accommodates the motor 12 (see FIGS. 2 and 4) in the interior thereof. One opening end of the second coupling member 7d, located on the same side as the second side plate 7b, is covered with a motor cover 45 illustrated in FIG. 4 after the motor 12 is attached to the second coupling member 7d. As illustrated in FIG. 5, the third coupling member 7e is a roughly plate-shaped member curved in a circular-arc shape, and couples the rear parts of the first and second side plates 7a and 7b of the reel unit 1. The fishing rod attachment leg 7g is a part for attaching the electric reel 100 to the fishing rod. The fishing rod attachment leg 7g is disposed in a roughly center part of the first coupling member 7c in the right-and-left direction, while being integrally formed with the first coupling member 7c. It should be noted that the fishing rod attachment leg 7g may be formed separately from the frame 7.

As illustrated in FIG. 2, the first side cover 8a has a third boss 8c for supporting a drive shaft 30 (see FIG. 8) in a rotatable state. The third boss 8c outwardly protrudes therefrom. Further, the first side cover 8a has a fourth boss 8d for supporting a second end (the right end in FIG. 3) of the spool shaft 14. The fourth boss 8d outwardly protrudes therefrom, while being located rearward of the third boss 8c. An output regulation member 5 is mounted between the first side cover 8a and the first side plate 7a. The output regulation member 5 is made in the form of a dial, and serves to regulate the output of the motor 12.

The second side cover 8b is fixed to the outer edge part of the second side plate 7b, for instance, by screws. As illustrated in FIG. 3, a connector 15 (see FIGS. 3 and 8) for connecting a power cable is mounted to the bottom surface of the front part of the second side cover 8b, while being faced downward.

The handle 2 is disposed on the same side as the first side cover 8*a*. As illustrated in FIGS. 1 and 2, the handle 2 includes a handle arm 2*a* and a handle knob 2*b* mounted to the tip end of the handle arm 2*a*. The handle 2 is mounted to the same side as the first side plate 7*a* of the reel unit 1. The handle 2 is coupled to the drive shaft 30 rotatably supported by the reel unit 1, while being unitarily rotatable therewith.

The front cover 9 is fixed in two (upper and lower) positions to the outer surface of the front part of the first side plate 7*a* and that of the front part of the second side plate 7*b* by, for instance, screws. The front cover 9 has a horizontally elongated opening (not illustrated in the drawings) bored for allowing the fishing line to pass therethrough. The front cover 9 covers the bottom surface of the front part of the water depth displaying unit 4.

The water depth displaying unit 4 is capable of displaying the water depth of the terminal tackle attachable to the tip end of the fishing line. As illustrated in FIGS. 1 and 5, the water depth displaying unit 4 is mounted to the upper part of the first side plate 7*a* and that of the second side plate 7*b*. The water depth displaying unit 4 includes a switch operating portion 6 having a plurality of (e.g., three) operating buttons for performing a display operation.

<Spool>

As illustrated in FIGS. 3 and 4, the spool 10 is disposed between the first side plate 7*a* and the second side plate 7*b*. The spool 10 is mounted onto the spool shaft 14, while being unitarily rotatable therewith. The spool 10 has a bobbin trunk 10*a*, a first flange 10*b* and a second flange 10*c*. The bobbin trunk 10*a* is formed in a tubular shape. The first and second flanges 10*b* and 10*c* are large-diameter parts integrally formed with the both ends of the bobbin trunk 10*a*. The first flange 10*b* is disposed on the same side as the first side plate 7*a*, whereas the second flange 10*c* is disposed on the same side as the second side plate 7*b*. The spool shaft 14 is fixed to the inner peripheral part of the bobbin trunk 10*a* by means of a suitable fixation method such as press-fitting.

As described above, the first end (the left end in FIG. 3) of the spool shaft 14 is rotatably supported by the spool support portion 17 through the first bearing 18*a*. On the other hand, the second end (the right end in FIG. 3) of the spool shaft 14 is rotatably supported by the fourth boss 8*d* of the first side cover 8*a* through a second bearing 18*b*.

A clutch pin 16*a*, composing a part of the clutch mechanism 16, radially penetrates a part of the spool shaft 14, i.e., a part positioned closer to the second bearing 18*b* than the spool fixed part is.

<Level Wind Mechanism>

As illustrated in FIG. 3, the level wind mechanism 22 is disposed roughly between the first side plate 7*a* and the second side plate 7*b*. As illustrated in FIGS. 4 and 5, the level wind mechanism 22 includes a fishing line guide 63, the traverse cam shaft 64 and a cam shaft cover 65. The fishing line guide 63 is a portion that the fishing line is inserted therethrough. The traverse cam shaft 64 has intersecting helical grooves 64*a* formed on the outer peripheral surface thereof. The cam shaft cover 65 covers the outer periphery of the traverse cam shaft 64. The fishing line guide 63 is disposed forward of the spool 10, and is configured to be capable of reciprocating along the spool shaft 14. The fishing line guide 63 is configured to be moved in a reciprocating manner by the rotation of the traverse cam shaft 64 configured to be rotated in conjunction with the driving force of the motor 12 and the rotation of the handle 2 in the fishing-line winding direction. The fishing line guide 63 includes a guide body 66*a* and an engaging member 66*b* (see FIG. 4). The guide body 66*a* has a guide part 66*c* that the fishing line is inserted through the inside thereof. The engaging member 66*b* is mounted to the guide body 66*a*, while being turnable at a predetermined angle. The guide part 66*c* is formed in a tubular shape, and a rigid ring 66*d* (see FIG. 5) is mounted to the interior of the guide part 66*c*. The guide body 66*a* is formed in a bent shape, and the traverse cam shaft 64 and the cam shaft cover 65 penetrate through the bent part of the guide body 66*a*. Further, the guide body 66*a* is guided along the traverse cam shaft 64 by a first guide shaft 67*a* and a second guide shaft 67*b*. The first and second guide shafts 67*a* and 67*b* are disposed in parallel to the traverse cam shaft 64 in two positions higher and lower than the traverse cam shaft 64. The engaging member 66*b* has an engaging protrusion 66*e* to be engaged with the helical grooves 64*a* of the traverse cam shaft 64. The engaging member 66*b* is accommodated in the guide body 66*a*, while being retained by a retainer member 66*f* that the second guide shaft 67*b* penetrates therethrough.

The traverse cam shaft 64 is disposed in parallel to the spool shaft 14. Further, as described above, the both ends of the traverse cam shaft 64 are rotatably supported by the first side plate 7*a* and the second side plate 7*b* through the first bushing 68*a* mounted to the first boss 19*c* and the second bushing 68*b* mounted to the second boss 7*j*. Thus, the traverse cam shaft 64 and the fishing line guide 63 are disposed adjacently to the spool 10. The traverse cam shaft 64 is configured to be rotated when either the driving force of the motor 12 or the rotation of the handle 2 is transmitted thereto by the spool drive mechanism 13. The traverse cam shaft 64 has a non-circular part 64*b* formed on one end thereof disposed on the same side as the first side plate 7*a*. The non-circular part 64*b* is coupled to the second gear member 61, while being unitarily rotatable therewith.

The cam shaft cover 65 is a thin tubular member. The cam shaft cover 65 is disposed adjacently to the outer peripheral surface of the traverse cam shaft 64 in order to prevent troubles such as attachment of a foreign object to the traverse cam shaft 64. An outer peripheral surface 65*a* of the cam shaft cover 65 is fitted to the guide body 66*a*. The cam shaft cover 65 has a cutout 65*b* in a part thereof through which the engaging member 66*b* passes. The cam shaft cover 65 is disposed between the first side plate 7*a* and the second side plate 7*b*. The both ends of the cam shaft cover 65 are supported, while being non-rotatably engaged with the outer peripheral surface of the first recess 68*c* of the first bushing 68*a* and that of the second recess 68*d* of the second bushing 68*b*.

<Plate Member>

Figure 7:
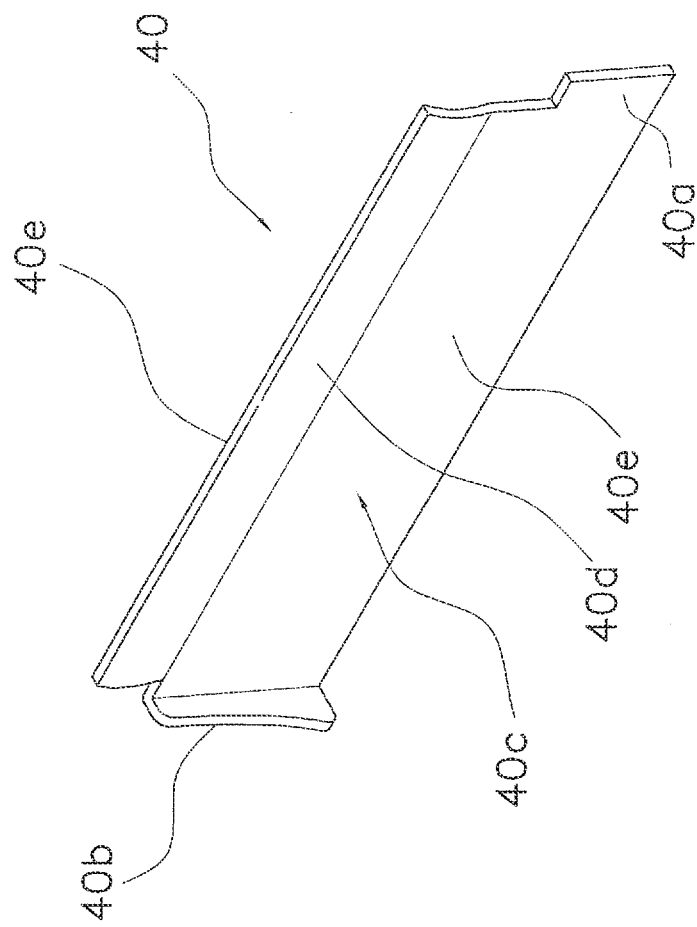
FIG. 7 is a perspective view of a plate member.

The plate member 40 is a plate member made of metal such as aluminum, magnesium, stainless steel or so forth. In the present exemplary embodiment, the plate member 40 is made of stainless steel, and is fabricated by means of, for instance, stamping. As illustrated in FIGS. 4 and 5, the plate member 40 is disposed along the axial direction of the spool shaft 14, while being disposed between the spool 10 and the fishing line guide 63. The plate member 40 is attached to the reel unit 1 from the side lateral to the frame 7. Specifically, in the present exemplary embodiment, the plate member 40 penetrates through the second side plate 7*b* and extends toward the first side plate 7*a*, while being fixed to the second side plate 7*b*. As illustrated in FIG. 7, the plate member 40 has the engaging part 40*a*, a fixation part 40*b* and a fishing-line anti-getting-stuck part 40*c*. The engaging part 40*a* is formed on one end of the plate member 40, i.e., the end disposed on the same side as the first side plate 7*a*. The engaging part 40*a* is engaged with the engaging groove 19*d* formed in the side plate body 19a of the first side plate 7a. The fixation part 40b is formed on the other end of the plate member 40, i.e., the end disposed on the same side as the second side plate 7b. The fishing-line anti-getting-stuck part 40c is formed between the engaging part 40a and the fixation part 40b.

The vertical length of the engaging part 40a is less than that of the fishing-line anti-getting-stuck part 40c. Thus, when the engaging part 40a is engaged with the engaging groove 19d, the fishing-line anti-getting-stuck part 40c is enabled to be contacted to the inner surface of the side plate body 19a.

The fixation part 40b is formed in a shape bent from the fishing-line anti-getting-stuck part 40c at an angle of roughly 90 degrees. The fixation part 40b is disposed in the attachment recess 7i formed on the outer lateral surface of the second side plate 7b. The thickness of the fixation part 40b is equal to or less than the depth of the attachment recess 7i. The fixation part 40b is formed in a shape similar to that of the attachment recess 7i, whereby the fixation part 40b is not easily moved while being fitted into the attachment recess 7i. The fixation part 40b is restricted from moving in a direction outwardly away from the second side plate 7b by the spool support portion 17 serving as a lid member. The fixation part 40b is fixed to the second side plate 7b, while being disposed in the attachment recess 7i and being interposed between the spool support portion 17 and the second side plate 7b.

The fishing-line anti-getting-stuck part 40c is capable of passing through the slit 7h bored in the second side plate 7b. As illustrated in FIG. 5, the cross-sectional contour of the fishing-line anti-getting-stuck part 40c is slightly less than that of the slit 7h. An upper section 40d of the fishing-line anti-getting-stuck part 40c is a section disposed on a side away from the fishing rod attachment leg 7g, and curves slightly rearward with respect to the up-and-down direction in order to avoid interference with the fishing line guide 63. Thus, the spool 10 and the fishing line guide 63 can be disposed adjacently to each other, while the stiffness of the fishing-line anti-getting-stuck part 40c can be enhanced. A lower section 40e of the fishing-line anti-getting-stuck part 40c is formed in a planar shape. The vertical length of the engaging part 40a is less than that of the lower section 40e. Further, as illustrated in FIG. 5, an end 40f of the plate member 40 (i.e., the top end of the upper section 40d of the fishing-line anti-getting-stuck part 40c) on the side away from the fishing rod attachment leg 7g is disposed on the side away from the fishing rod attachment leg 7g (i.e., the upper side) with respect to a tangent CL that connects the outer peripheral surface 65a of the cam shaft cover 65 on the same side as the fishing rod attachment leg 7g (i.e., the lower side) and a fishing-line maximally wound position 10d of the spool 10 on the side away from the fishing rod attachment leg 7g (i.e., the upper side).

The plate member 40 is attached to the frame 7 of the reel unit 1 from the same side as the second side plate 7b toward the first side plate 7a. In attaching the plate member 40 to the frame 7 of the reel unit 1, the fishing-line anti-getting-stuck part 40c is inserted into the slit 7h while the fixation part 40b of the plate member 40 is held. The engaging part 40a is then engaged with the engaging groove 19d of the side plate body 19a. When the engaging part 40a is thus engaged with the engaging groove 19d, the fixation part 40b is disposed within the attachment recess 7i. When the spool support portion 17 is fixed to the second side plate 7b by the three screw members 70 under the condition, the fixation part 40b of the plate member 40 is fixed to the frame 7 while being interposed between the spool support portion 17 and the attachment recess 7i of the second side plate 7b. On the other hand, when the plate member 40 is detached from the frame 7, it is only required to detach the spool support portion 17, and then, to pull out the plate member 40 while the fixation part 40b is held.

The plate member 40 is herein configured to be attached to the frame 7 from the side lateral to the frame 7. Thus, the plate member 40 can be easily attached to the reel unit 1. On the other hand, the plate member 40 can be easily detached from the frame 7 by pulling out the plate member 40 from the side lateral to the frame 7. Especially in the present exemplary embodiment, the plate member 40 is attached to the frame 7 from the same side as the second side plate 7b. Hence, when being detached from the frame 7, detachment of the plate member 40 is enabled only by removing the second side cover 8b and the spool support portion 17. Therefore, the plate member 40 can be further easily detached from the frame 7.

<Clutch Mechanism>

As illustrated in FIG. 3, the clutch mechanism 16 includes the clutch pin 16a and two clutch recesses 16b. The clutch recesses 16b are recessed on the surface of the left end (see FIG. 3) of a pinion gear 32, while being located in two positions along the diameter of the surface of the left end of the pinion gear 32. The pinion gear 32 composes a part of the clutch mechanism 16, and simultaneously composes a part of a first rotation transmission mechanism 24 (to be described) of the spool drive mechanism 13. The pinion gear 32 is configured to be moved along the axial direction of the spool shaft 14 between a clutch-on position illustrated in FIG. 3 and a clutch-off position shifted rightward from the clutch-on position. In the clutch-on position, the clutch pin 16a is engaged with the clutch recesses 16b. The rotation of the pinion gear 32 is thereby transmitted to the spool shaft 14. Thus, the clutch mechanism 16 is set to be in the clutch-on state. In the clutch-on state, the pinion gear 32 and the spool shaft 14 become unitarily rotatable. By contrast, in the clutch-off position, the clutch recesses 16b are separated away from the clutch pin 16a. The rotation of the pinion gear 32 is thereby prevented from being transmitted to the spool shaft 14. Thus, the clutch mechanism 16 is set to be in the clutch-off state. The spool 10 herein becomes freely rotatable. As described above, when the clutch operating member 11 is operated, the clutch mechanism 16 is actuated through the clutch control mechanism 20.

<Clutch Operating Member>

The clutch operating member 11 serves to perform an operation of switching the clutch mechanism 16 between the clutch-on state and the clutch-off state. As illustrated in FIG. 5, the clutch operating member 11 is disposed in the rear part of the reel unit 1, while being interposed between the first side plate 7a and the second side plate 7b. The clutch operating member 11 is configured to be movable in a direction closer to the fishing rod attachment leg 7g and a direction away from the fishing rod attachment leg 7g. In the present exemplary embodiment, the clutch operating member 11 is mounted so as to be pivotable about the axis of the spool 10. The clutch operating member 11 is configured to pivot between the clutch-on position depicted with a solid line in FIG. 5 and the clutch-off position depicted with a dashed two-dotted line in FIG. 5.

<Spool Drive Mechanism>

Figure 8:
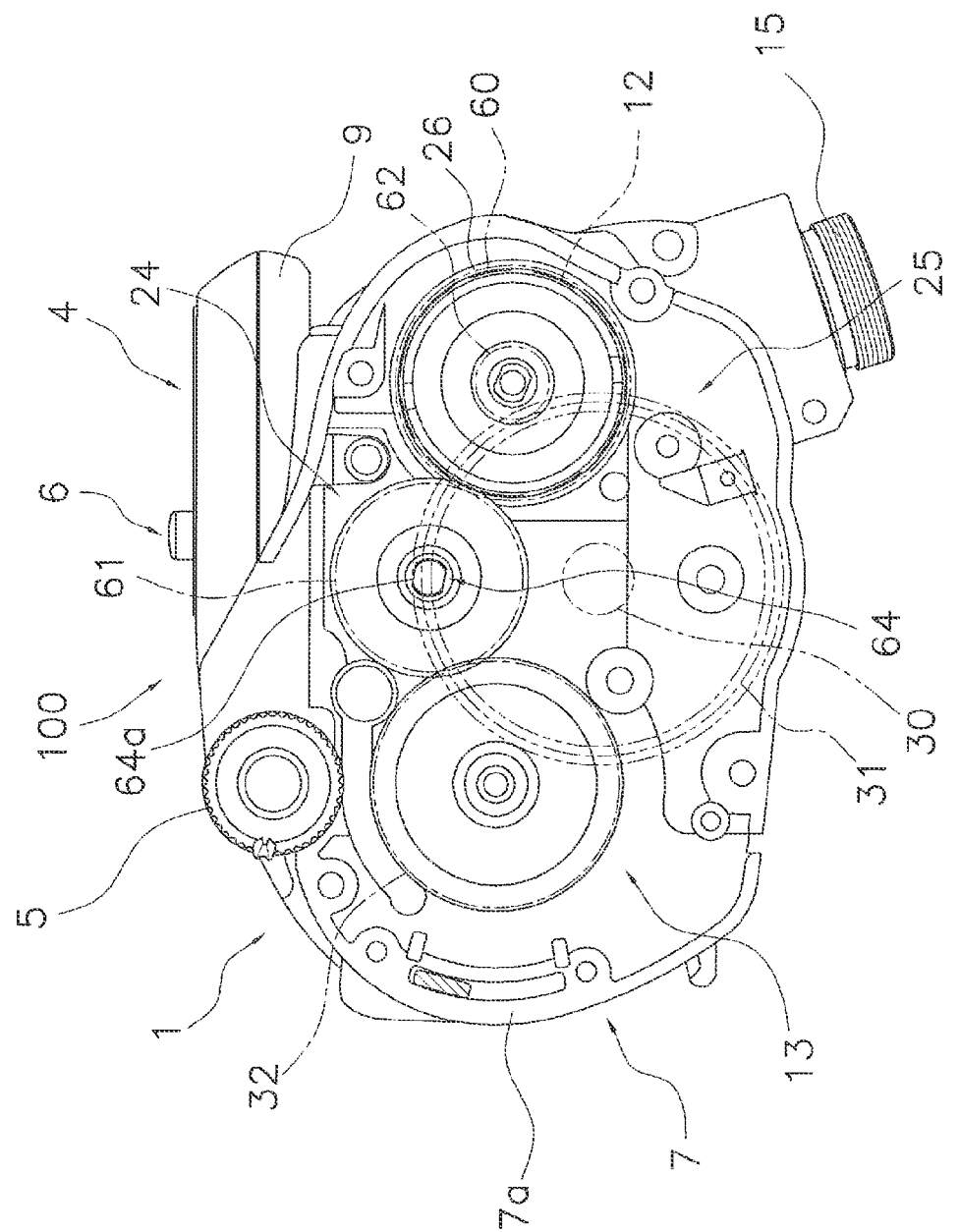
FIG. 8 is a left side view of the electric reel that a first side cover and a mechanism attachment plate are detached therefrom.

The spool drive mechanism 13 is configured to drive the spool 10 in the fishing-line winding direction. Further, the spool drive mechanism 13 is configured to produce drag force for the spool 10 in winding the fishing line in order to prevent cutting of the fishing line. As illustrated in FIG. 8, the spool drive mechanism 13 includes the motor 12, the first rotation transmission mechanism 24 and a second rotation transmission mechanism 25. The motor 12 is prevented from rotating in the fishing-line winding direction by an anti-reverse portion 36 (see FIG. 4) made in the form of a roller clutch. The first rotation transmission mechanism 24 is configured to decelerate the rotation of the motor 12 and transmit the decelerated rotation of the motor 12 to the spool 10. On the other hand, the second rotation transmission mechanism 25 is configured to accelerate the rotation of the handle 2 through the first rotation transmission mechanism 24 and transmit the accelerated rotation of the handle 2 to the spool 10.

As illustrated in FIG. 8, the first rotation transmission mechanism 24 includes a planetary reduction mechanism (not illustrated in the drawings) coupled to the output shaft of the motor 12. A casing 26 of the planetary reduction mechanism has an internal gear (not illustrated in the drawings) formed on the inner surface thereof. Output of the internal gear is configured to be transmitted to the spool 10 by a first gear member 60 formed on the outer peripheral surface of the casing 26. Specifically, the first rotation transmission mechanism 24 further includes the first gear member 60, the second gear member 61 and the pinion gear 32. The second gear member 61 is meshed with the first gear member 60. The pinion gear 32 is meshed with the second gear member 61. The second gear member 61 and the pinion gear 32 are disposed between the mechanism attachment plate 19b and the outer surface of the side plate body 19a. The second gear member 61 is an intermediate gear configured to transmit the rotation of the first gear member 60 to the pinion gear 32 such that the rotational direction of the pinion gear 32 can be identical to that of the first gear member 60. The second gear member 61 is rotatably supported by the first boss 19c of the side plate body 19a and the mechanism attachment plate 19b through a rolling-element bearing. As illustrated in FIG. 8, the traverse cam shaft 64 is coupled to the second gear member 61, while being unitarily rotatable therewith. The traverse cam shaft 64 has the non-circular part 64b formed on the end thereof disposed on the same side as the first side plate 7a. The second gear member 61 rotates the traverse cam shaft 64, while being engaged with the non-circular part 64b.

The pinion gear 32 is mounted to the first side plate 7a through a bearing (not illustrated in the drawings) mounted to the side plate body 19a, while being axially movable and rotatable about the spool shaft 14. The pinion gear 32 is controlled by the clutch control mechanism 20, and is thereby configured to be axially moved on the outer peripheral side of the spool shaft 14 between the clutch-on position and the clutch-off position.

As illustrated in FIG. 8, the second rotation transmission mechanism 25 includes the drive shaft 30 to which the handle 2 is coupled in a unitarily rotatable state, a drive gear 31, a third gear member 62 and the drag mechanism (not illustrated in the drawings).

The drive shaft 30 is rotatably supported by the mechanism attachment plate 19b and the first side cover 8a. The drive shaft 30 is prevented from rotating in the fishing-line releasing direction by a roller-type one-way clutch (not illustrated in the drawings). The drive gear 31 is rotatably mounted to the drive shaft 30. The rotation of the drive gear 31 is configured to be braked in the fishing-line releasing direction by the drag mechanism. Accordingly, the rotation of the spool 10 is braked in the fishing-line releasing direction.

The third gear member 62 is disposed for transmitting the rotation of the handle 2 to the spool 10. The third gear member 62 is coupled to a carrier of the planetary reduction mechanism, while being unitarily rotatable therewith. The third gear member 62 is meshed with the drive gear 31 for transmitting the rotation of the handle 2 to the carrier of the planetary reduction mechanism. The rotation, transmitted to the carrier, is then transmitted to the pinion gear 32 through the first gear member 60 and the second gear member 61. The reduction ratio from the third gear member 62 to the second gear member 61 is set to be roughly "1".

In the electric reel 100 thus structured, the fishing line can be reeled in either by operating the output regulation member 5 or by rotating the handle 2 in the fishing-line winding direction. Further, when the clutch operating member 11 is operated and pushed from the clutch-on position to the clutch-off position, the clutch mechanism 16 is set to be in the clutch-off state and the spool 10 can be thereby freely rotatable. Thus, the fishing line can be reeled out by the weight of the terminal tackle attached to the tip end of the fishing line. When the fishing line is herein released at a high speed by casting or by using a heavy terminal tackle, chances are that the fishing line sags in the spool 10. However, in the electric reel 100 of the present exemplary embodiment, the plate member 40 is mounted between the spool 10 and the fishing line guide 63 of the level wind mechanism 22. Therefore, even when sagging of the fishing line is caused, the fishing line becomes unlikely to get stuck with the fishing line guide 63.

Other Exemplary Embodiments

One exemplary embodiment of the present invention has been explained above. However, the present invention is not limited to the aforementioned exemplary embodiment. A variety of changes can be made without departing from the scope of the present invention. Especially, a plurality of exemplary embodiments and modifications described in the present specification can be arbitrarily combined on an as-needed basis.

(a) In the aforementioned exemplary embodiment, the present invention has been explained by exemplifying the electric reel 100 equipped with the motor 12 as a dual-bearing reel. However, the present invention is not limited to the electric reel, and is also applicable to a manual dual-bearing reel. Especially, there is a type of manual dual-bearing reel that the second side cover, disposed oppositely to the handle attachment side, is configured to be openable in a single touch operation. In such a manual dual-bearing reel, attachment and detachment of the plate member can be further easily performed.

(b) In the aforementioned exemplary embodiment, the plate member 40 is laterally attached to the reel unit 1 from the side opposite to the handle 2. However, the plate member 40 may be attached to the reel unit 1 from the same side as the handle 2. In this case, the plate member 40 is only required to be attached to the reel unit 1 before the spool drive mechanism 13 is embedded in the reel unit 1.

(c) In the aforementioned exemplary embodiment, the plate member 40 is made of metal. However, the plate member 40 may be made of synthetic resin. When being made of synthetic resin, the plate member 40 may have a non-uniform thickness.

(d) The aforementioned exemplary embodiment has exemplified the dual-bearing reel including the level wind mechanism 22 configured to be actuated when the spool 10 is rotated in the fishing-line winding direction. However, the present invention is not limited to the dual-bearing reel. The present invention is also applicable to a dual-bearing reel including a level wind mechanism configured to be similarly actuated when the spool 10 is rotated in the fishing-line releasing direction.

(e) In the aforementioned exemplary embodiment, the surface of the plate member 40, opposed to the spool 10, has not been processed with surface finishing. However, the surface of the plate member 40 may be processed with surface finishing for enhancing slidability thereof (e.g., metal plating, plating of metal containing fluoride compound, etc.).

(f) In the aforementioned exemplary embodiment, the upper section 40d of the fishing-line anti-getting-stuck part 40c is curved rearward. However, the present invention is not limited to the structure. The fishing-line anti-getting-stuck part 40c may not be curved when a sufficient space is produced between the spool 10 and the fishing line guide 63.

<Features>

The aforementioned exemplary embodiment can be expressed as follows.

(A) The electric reel 100 (an exemplary dual-bearing reel) is a reel that is attachable to the fishing rod and is configured to forwardly reel out the fishing line. The electric reel 100 includes the handle 2, the reel unit 1, the spool 10, the level wind mechanism 22 and the plate member 40. The reel unit 1 includes the fishing rod attachment leg 7g and the frame 7. The fishing rod attachment leg 7g enables the fishing rod to be attached thereto. The frame 7 has the first side plate 7a and the second side plate 7b. The first side plate 7a is disposed on the same side as the handle 2. The second side plate 7b is disposed away from the first side plate 7a so as to enable the spool 10 to be disposed between the first side plate 7a and the second side plate 7b. The spool 10 is rotatable with respect to the reel unit 1 and is capable of winding the fishing line thereabout. The level wind mechanism 22 includes the fishing line guide 63 that is disposed forward of the spool 10 and is reciprocatable along the spool shaft 14 as the rotation shaft of the spool 10. The plate member 40 is a member formed in a plate shape; however, the plate member may be any type of desirable cover. The plate member 40 is disposed between the spool 10 and the fishing line guide 63 along the axial direction of the spool shaft 14, and is attached to the reel unit 1 from a side lateral to the frame 7.

In the present electric reel 100, the plate member 40 is disposed between the spool 10 and the fishing line guide 63, and is attached to the reel unit 1 from the side lateral to the reel unit frame 7 having the first side plate 7a and the second side plate 7b. In attaching thus structured; member 40 to the reel unit 1 from the side lateral to the frame 7, attachment of the plate member 40 is enabled by forming the slit 7h with a width slightly greater than the plate thickness of the plate member 40 in the frame 7. Here, the plate member 40, designed to be disposed between the spool 10 and the fishing line guide 63, is attached to the reel unit 1 from the side lateral to the frame 7. Therefore, the plate member 40 can be easily attached to the reel unit 1.

(B) The plate member 40 may be fixed to the second side plate 7b, and may extend toward the first side plate 7a while penetrating through the second side plate 7b. According to the structure, the number of mechanisms to be attached to the second side plate 7b disposed on the opposite side of the handle 2 is less than the number of mechanism to be attached to the first side plate 7a disposed on the same side as the handle 2. Therefore, the plate member 40 can be further easily attached to the reel unit 1.

(C) The second side plate 7b may have the opening 7f formed in a circular shape. The reel unit 1 may further include the spool support portion 17 (an exemplary lid member) that is detachably fixed to the second side plate 7b so as to close the opening 7f. The plate member 40 may be restricted from moving in the direction outwardly away from the second side plate 7b by the spool support portion 17. According to the structure, the plate member 40 is restricted from moving in the direction outwardly away from the second side plate 7b by the spool support portion 17 closing the opening 7f. Hence, it is not required to provide an element for restricting movement of the plate member 40. Thus, the electric reel 100 can be simply structured.

(D) The second side plate 7b may have the slit 7h enabling the plate member 40 to penetrate therethrough. The first side plate 7a may have the engaging groove 19d enabling the engaging part 40a as one end of the plate member 40 to be engaged therewith. The one end is disposed on the same side as the first side plate 7a. According to the structure, the engaging part 40a as one end of the plate member 40 is engaged with the engaging groove 19d of the first side plate 7a, while penetrating through the slit 7h formed in the second side plate 7b. Therefore, it is possible to easily position the plate member 40 both to the first side plate 7a by the engaging groove 19d and to the second side plate 7b by the slit 7h.

(E) The plate member 40 may have the fixation part 40b on the other end thereof disposed on the same side as the second side plate 7b. The fixation part 40b is fixed to the second side plate 7b, while being interposed between the spool support portion 17 and the second side plate 7b. According to the structure, the plate member 40 is fixed to the reel unit 1 while the fixation part 40b thereof is interposed between the spool support portion 17 and the second side plate 7b. Therefore, the plate member 40 can be fixed to the reel unit 1 without using a fixation member such as a bolt for fixing the plate member 40. On the other hand, the plate member 40 can be easily detached from the reel unit 1 when being unnecessary.

(F) The level wind mechanism 22 may further include the traverse cam shaft 64 and the cam shaft cover 65. The traverse cam shaft 64 is configured to reciprocate the fishing line guide 63 in conjunction with the rotation of the handle 2. The cam shaft cover 65 is a member formed in a tubular shape. The cam shaft cover 65 covers the outer periphery of the traverse cam shaft 64, while allowing the fishing line guide 63 to be disposed on the outer periphery thereof. The end 40f of the plate member 40 on the side away from the fishing rod attachment leg 7g in the direction intersecting with the elongated direction of the plate member 40 is disposed on the side away from the fishing rod attachment leg 7g with respect to the tangent CL connecting the outer peripheral surface 65a of the cam shaft cover 65 on the same side as the fishing rod attachment leg 7g and the fishing-line maximally wound position 10d of the spool 10 on the side away from the fishing rod attachment leg 7g. According to the structure, the end 40f of the plate member 40 on the side away from the fishing rod attachment leg 7g is disposed on the side away from the fishing rod attachment leg 7g with respect to the tangent CL. The tangent CL is herein set as a line touching the outer periphery of the cam shaft cover 65 on the same side as the fishing rod attachment leg 7g and the fishing-line maximally wound position 10d of the spool 10 on the side away from the fishing rod attachment leg 7g. The tangent CL intersects with a line connecting the center of the spool 10 and the center of the cam shaft cover 65. The end 40f of the plate member 40 is disposed on the side away from the fishing rod attachment leg 7g with respect to the tangent CL set as described above. Hence, the fishing line, sagging from the spool 10, becomes further unlikely to get stuck with the fishing line guide 63.

(G) The electric reel 100 may further include the motor 12 that is disposed forward of the level wind mechanism 22 and is configured to drive and rotate the spool 10. According to the structure, the plate member 40 can be easily attached to the reel unit 1 in the electric reel 100.

What is claimed is:

1. A dual-bearing reel being attachable to a fishing rod and being configured to forwardly reel out a fishing line, comprising:
   a handle disposed on a first side of the dual-bearing reel;
   a reel unit including a fishing rod attachment leg and a frame, the fishing rod attachment leg enabling the fishing rod to be attached thereto, the frame having a first side plate and a second side plate, the first side plate being disposed on the first side, the second side plate being disposed on a second side of the dual-bearing reel, the second side being opposite the first side, so as to enable a spool to be disposed between the first side plate and the second side plate;
   the spool being rotatable with respect to the reel unit and being capable of winding the fishing line thereabout;
   a level wind mechanism including a fishing line guide, the fishing line guide being disposed forward of the spool and being reciprocatable along a rotation shaft of the spool; and
   a plate member, the plate member being disposed between the spool and the fishing line guide that extends along an axial direction of the rotation shaft, the plate member being attached to the reel unit from a side lateral to the frame,
   the plate member being fixed to the second side plate, extending toward the first side plate, and penetrating through the second side plate, the second side plate having a slit enabling the plate member to penetrate therethrough, and the first side plate having an engaging groove enabling a first end of the plate member to be engaged therewith, the first end of the plate member being disposed on the first side.

2. The dual-bearing reel according to claim 1, wherein
   the second side plate has an opening having a circular shape,
   the reel unit includes a lid member, the lid member being detachably fixed to the second side plate so as to close the opening, and
   the plate member is restricted from moving in a direction outwardly away from the second side plate by the lid member.

3. The dual-bearing reel according to claim 2, wherein
   the level wind mechanism further includes
   a traverse cam shaft configured to reciprocate the fishing line guide in conjunction with rotation of the handle, and
   a cam shaft cover having a tubular shape, the cam shaft cover covering an outer periphery of the traverse cam shaft, the earn shaft cover enabling the fishing line guide to be disposed on an outer periphery thereof,
   an end of the plate member on a side opposite the fishing rod attachment leg in a direction intersecting an elongated direction of the plate member is disposed on the side opposite the fishing rod attachment leg with respect to a tangent connecting an outer peripheral part of the cam shaft cover on the same side as the fishing rod attachment leg and a fishing-line maximally wound position of the spool on the side opposite the fishing rod attachment leg.

4. The dual-bearing reed according to claim 2, further comprising:
   an electric motor disposed forward of the level wind mechanism, the electric motor being configured to drive and rotate the spool.

5. The dual-bearing reel according to claim 1, further comprising:
   an electric motor disposed forward of the level wind mechanism, the electric motor being configured to drive and rotate the spool.

6. The dual-bearing reel according to claim 1, wherein
   the plate member has a fixation part on a second end thereof disposed on the second side, the fixation part being fixed to the second side plate while being interposed between the lid member and the second side plate.

7. The dual-bearing reel according to claim 1, wherein
   the level wind mechanism further includes
   a traverse cam shaft configured to reciprocate the fishing line guide in conjunction with rotation of the handle, and
   a cam shaft cover having a tubular shape, the cam shaft cover covering an outer periphery of the traverse cam shaft, the cam shaft cover enabling the fishing line guide to be disposed on an outer periphery thereof,
   an end of the plate member on a side opposite the fishing rod attachment leg in a direction intersecting an elongated direction of the plate member is disposed on the side opposite the fishing rod attachment leg with respect to a tangent connecting an outer peripheral part of the cam shaft cover on the same side as the fishing rod attachment leg and a fishing-line maximally wound position of the spool on the side opposite the fishing rod attachment leg.

8. A dual-bearing reel being attachable to a fishing rod and being configured to forwardly reel out a fishing line, comprising:
   a handle disposed on a first side of the dual-bearing reel;
   a reel unit including a fishing rod attachment leg and a frame, the fishing rod attachment leg enabling the fishing rod to be attached thereto, the frame having a first side plate and a second side plate, the first side plate being disposed on the first side, the second side plate being disposed on a second side of the dual-bearing reel, the second side being opposite the first side, so as to enable a spool to be disposed between the first side plate and the second side plate;
   the spool being rotatable with respect to the reel unit and being capable of winding the fishing line thereabout;
   a level wind mechanism including a fishing line guide, the fishing line guide being disposed forward of the spool and being reciprocatable along a rotation shaft of the spool; and
   a plate member disposed between the spool and the fishing line guide that extends along an axial direction of the rotation shaft, the plate member being attached to the reel unit from a side lateral to the frame,
   the plate member being fixed to the second side date extending toward the first side plate, and penetrating through the second side plate,
   the plate member being restricted from moving in a direction outwardly away from the second side plate by the lid member, and the plate member having a fixation part on a second end thereof disposed on the second side, the fixation part being fixed to the second side plate while being interposed between the lid member and the second side plate.

9. The dual-bearing reel according to claim 8, wherein
the second side plate has a slit enabling the plate member to penetrate therethrough, and
the first side plate has an engaging groove enabling a first end of the plate member to be engaged therewith, the first end of the plate member being disposed on the first side.

10. The dual-bearing reel according to claim 8, wherein the level wind mechanism further includes
   a traverse cam shaft configured to reciprocate the fishing line guide in conjunction with rotation of the handle, and
   a cam shaft cover having a tubular shape, the cam shaft cover covering an outer periphery of the traverse cam shaft, the cam shaft cover enabling the fishing line guide to be disposed on an outer periphery thereof,
an end of the plate member on a side opposite the fishing rod attachment leg in a direction intersecting an elongated direction of the plate member is disposed on the side opposite the fishing rod attachment leg with respect to a tangent connecting an outer peripheral part of the cam shaft cover on the same side as the fishing rod attachment leg and a fishing-line maximally wound position of the spool on the side opposite the fishing rod attachment leg.

11. The dual-bearing reel according to claim 8, further comprising:
   an electric motor disposed forward of the level wind mechanism, the electric motor being configured to drive and rotate the spool.

12. A dual-bearing reel being attachable to a fishing rod and being configured to forwardly reel out a fishing line, comprising:
   a handle disposed on a first side of the dual-bearing reel;
   a reel unit including a fishing rod attachment leg and a frame, the fishing rod attachment leg enabling the fishing rod to be attached thereto, the frame having a first side plate and a second side plate, the first side plate being disposed on the first side, the second side plate being disposed on a second side of the dual-bearing reel, the second side being opposite the first side, so as to enable a spool to be disposed between the first side plate and the second side plate;
   the spool being rotatable with respect to the reel unit and being capable of winding the fishing line thereabout;
   a level wind mechanism including a fishing line guide, the fishing line guide being disposed forward of the spool and being reciprocatable along a rotation shaft of the spool; and
   a plate member disposed between the spool and the fishing line guide that extends along an axial direction of the rotation shaft, the plate member being attached to the reel unit from a side lateral to the frame,
   the level wind mechanism further including
      a traverse cam shaft configured to reciprocate the fishing line guide in conjunction with rotation of the handle, and
      a cam shaft cover having a tubular shape, the cam shaft cover covering an outer periphery of the traverse cam shaft, the cam shaft cover enabling the fishing line guide to be disposed on an outer periphery thereof,
   an end of the plate member on a side opposite the fishing rod attachment leg in a direction intersecting an elongated direction of the plate member being disposed on the side opposite the fishing rod attachment leg with respect to a tangent connecting an outer peripheral part of the cam shaft cover on the same side as the fishing rod attachment leg and a fishing-line maximally wound position of the spool on the side opposite the fishing rod attachment leg.

13. The dual-bearing reel according to claim 12, further comprising:
   an electric motor disposed forward of the level wind mechanism, the electric motor being configured to drive and rotate the spool.

* * * * *